United States Patent [19]
Schafer et al.

[11] 3,882,253
[45] May 6, 1975

[54] DIRECTLY EDIBLE AND RAPIDLY REHYDRATABLE COMPACTED AND DEHYDRATED FOOD BAR AND METHOD OF MAKING THE SAME

[75] Inventors: Glenn R. Schafer; Abdul R. Rahman, both of Natick, Mass.

[73] Assignee: The United States of America as represented by the Secretary of the Army, Washington, D.C.

[22] Filed: Feb. 15, 1974

[21] Appl. No.: 443,071

[52] U.S. Cl. ............. 426/637; 426/285; 426/454; 426/456; 426/468; 426/810; 426/385; 426/640
[51] Int. Cl.............................................. A23b 7/02
[58] Field of Search .......... 426/146, 205, 206, 207, 426/209, 213, 342, 346, 377, 378, 453, 454, 455, 456, 810, 285, 468, 506, 512, 516, 384, 385

[56] References Cited
UNITED STATES PATENTS

| | | | |
|---|---|---|---|
| 3,083,108 | 3/1963 | Kline | 426/385 |
| 3,385,715 | 5/1968 | Ishler | 426/454 |
| 3,431,112 | 3/1969 | Durst | 426/195 |
| 3,489,575 | 1/1970 | Johnson | 426/385 |

Primary Examiner—Norman Yudkoff
Assistant Examiner—Martin G. Mullen
Attorney, Agent, or Firm—Nathan Edelberg; Robert P. Gibson; Charles C. Rainey

[57] ABSTRACT

Compacted and dehydrated food bars which may be easily bitten and chewed without prior rehydration or rapidly rehydrated in bar form in cold water are prepared by incorporating potato particles, preferably dice, which have been freeze-vacuum-dehydrated to less than 4 percent moisture content and thereafter equilibrated with water to a moisture content of from about 5 to about 15 percent by weight, in a food bar preparation mixture in a proportion of about 10 to about 20 percent potato to about 90 to about 80 percent non-potato food bar-forming ingredients, and thereafter compressing the mixture of the potato particles with the non-potato food bar-forming ingredients into a bar at a pressure from about 800 psi to about 1500 psi and redrying the compressed food bar under vacuum to a moisture content below about 4 percent by weight.

10 Claims, No Drawings

DIRECTLY EDIBLE AND RAPIDLY REHYDRATABLE COMPACTED AND DEHYDRATED FOOD BAR AND METHOD OF MAKING THE SAME

The invention described herein may be manufactured, used, and licensed by or for the Government for governmental purposes without the payment to us of any royalty thereon.

BACKGROUND OF THE INVENTION

This invention relates to a method of making compacted, dehydrated food bars which are directly edible without prior rehydration or which may be quickly rehydrated substantially completely in water at about room temperature or even lower temperatures. The invention also relates to the compacted, rapidly rehydratable, dehydrated food bars.

Compacted, dehydrated food bars have been utilized by the Armed Forces in field rations, by astronauts during space explorations, by earth explorers, hikers, and others who must carry their food supplies along with them and who need to conserve space as much as is reasonably possible without sacrifice in the nutritional qualities of their food supplies. An outstanding advantage of rations in this form is that they provide highly concentrated nutritional values in compact and convenient forms. They also may be stored for considerable periods of time without spoilage, especially when the moisture contents of the bars are sufficiently low to prevent growth of microorganisms therein and the bars are maintained in a moisture-impermeable container or package.

One of the outstanding problems encountered with food bars is that when they are compacted by application of pressure in the formation of the bars, if the pressure applied is sufficiently high to cause the food bar-forming ingredients to adhere well enough to form a food bar which is not too fragile to handle in the normal activities of the user of the food bar, the resulting compacted food bar is difficult to rehydrate, especially in cold water, and is so hard that direct eating of the food bar is virtually impossible. In some cases such food bars have been known to cause breakage of teeth if they were eaten without prior rehydration and yet it may not be practical under certain field conditions to take the time to heat a quantity of water to rehydrate a food bar sufficiently to render it edible in such instances.

It is, therefore, an object of the invention to provide a method of making compacted and dehydrated food bars which may be directly eaten without prior rehydration or which may be rapidly rehydrated in bar form in cold water, particularly water at about room temperature or at the ambient temperature in which the military user or a sportsman or other user would customarily be operating.

It is also an object of the invention to provide compacted, dehydrated food bars which may be directly eaten without prior rehydration thereof or which may be rapidly rehydrated with cold water, particularly water at about room temperature or at the ambient temperature in which the military user or a sportsman or other user would customarily be operating.

Other objects and advantages will be apparent from the following description of the invention, and the novel features will be particularly pointed out hereinafter in connection with the appended claims.

SUMMARY

The compacted, dehydrated food bars of the invention are prepared by incorporating potato particles, preferably flavored, and preferably as dice, which have been blanched, freeze-vacuum-dehydrated to a moisture content below about 4 percent by weight, and thereafter equilibrated with water until they reach a moisture content of from about 5 to about 15 percent by weight, in a food bar preparation mixture in a proportion by weight of about 10 to about 20 percent potato based on the freeze-dehydrated form to about 90 to about 80 percent of the non-potato food bar-forming ingredients, and thereafter compressing the mixture of the potato particles with the non-potato food bar-forming ingredient mixture into a bar and redrying the compressed food bar under vacuum to a moisture content below about 4 percent by weight to produce compacted and dehydrated food bars having densities, for example, of from about 1 gm per cc to about 1.4 gm per cc. The compression of the food bars is carried out at from about 800 to about 1500 psi, using a dwell time of from about 5 to about 20 seconds.

DESCRIPTION OF THE PREFERRED EMBODIMENTS

The following examples illustrate the preferred practice of the invention, both as to method and product:

EXAMPLE I

Raw U.S. No. 1 grade Idaho Russet potatoes were washed, peeled and submerged in an aqueous solution containing about 1.0 gram of sodium meta bisulfite per gallon to prevent darkening of the peeled potatoes. The peeled potatoes having sodium meta bisulfite solution over their exterior surfaces were diced in a potato dicer to form substantially cube-shaped particles or dice of about 0.375 inch on each side and the dice were immediately submerged in an aqueous solution of sodium meta bisulfite of the same concentration as above. The potato dice were removed from the aqueous solution of sodium meta bisulfite and blanched for about 1.5 to 2 minutes by submerging them in an aqueous solution of a flavoring ingredient described below at from about 170°F. to about 212°F. The blanching solution had been brought to a boil and had been removed from the source of heat immediately prior to submerging the potato dice therein. The flavoring agent employed was lemon juice crystals, manufactured by Plant Industries, Inc., Anaheim, California, and was employed to mask the natural potato flavor in the potato dice. It was employed in a concentration of about 6 ounces of lemon juice crystals per gallon of water.

The blanched potato dice were removed from the hot aqueous solution after the blanching period and immediately cooled in a cold chamber to 40°–50°F. The flavored aqueous solution used in blanching the potato dice was retained and permitted to cool to about 40°–50°F. The cooled potato dice were then returned to the cooled, flavored aqueous solution and permitted to soak therein for from about 2 to about 4 hours to absorb more of the lemon flavor without being cooked. The potato dice were then removed from the flavored aqueous solution and drained free of excess solution, then freeze-vacuum-dehydrated in a conventional manner employing a shelf or platen temperature in the vacuum dehydrator of about 80°F., the potato dice having their moisture content reduced during the freeze-vacuum-dehydration to about 2 percent.

The freeze-dried potato dice were then sprayed with sufficient water to impart to the dice, upon equilibration, a moisture concentration of about 12 percent. The dice with water sprayed thereon were enclosed in airtight containers and permitted to stand therein for a period of time sufficient to permit the moisture to equilibrate throughout the potato dice so that all of the dice would have a moisture concentration of about 12 percent. This required about 3 hours, but could be extended to assure the utmost in uniformity of distribution of the moisture throughout the potato dice, uniformity of moisture distribution throughout the previously freezedried potato dice being important in determining how well the potato dice mixed with the non-potato food bar-forming ingredients would retain their identity through compression into food bars and rehydration thereof. The better the retention of identity and particle discreteness by the potato dice, the more rapid the rehydration of the food bars prepared with the freeze-dried and remoistened potato dice as a constituent thereof.

A cherry food bar preparation mixture was prepared by mixing the following ingredients in the percentages (by weight) thereof shown in Table 1:

Table 1

| Ingredient | Percentage |
| --- | --- |
| Apple sauce, dehydrated (non-caking) | 25.8 |
| Sugar | 22.7 |
| Potato dice, lemon-flavored, freeze-dried | 15.6 |
| "Texgran" soy protein, sour cherry-flavored | 15.1 |
| Almonds, slivered | 10.9 |
| Cherry powder, freeze-dried | 4.5 |
| Cherries, Maraschino, dry | 3.9 |
| Silicon dioxide anti-caking agent ("Syloid 244") | 1.5 |
| Total | 100.0 |
| "Red Lake Blend No. 9443" color | 0.044 per 100 parts above |

The apple sauce, dehydrated (non-caking) was produced in accordance with Rahman et al U.S. Pat. No. 3,535,127, in the process of the production of which approximately 150 percent sucrose and 1.5 percent malic acid were blended into the apple base. "Texgran" soy protein is a textured soy flour manufactured by Swift & Co. The sour cherry flavor incorporated in the Texgran was imparted thereto by first mixing Sour Cherry Flavor No. 8139, manufactured by Food Materials Corporation, Chicago, Ill. with "Durkex 500" oil, a 400 A.O.M. hydrogenated vegetable oil manufactured by Durkee Food Service Group, SCM Corporation, Cleveland, Ohio, in 1:1 proportions (by weight) to obtain a sour cherry-flavored oil, then blending Texgran soy protein with the sour cherry-flavored oil in the proportions of 4 parts Texgran to 1 part sour cherry-flavored oil (by weight). The "Syloid 244" silicon dioxide anti-caking agent is manufactured by W. R. Grace & Co., Davison Chemical Division, Baltimore, Md. The "Red Lake Blend No. 9443" is a red coloring blend manufactured by Warner-Jenkinson Co., St. Louis, Mo.

Thirty grams of the mixture of Table 1 were formed into each bar 3 inches long × 1 inch wide and compressed in a Carver press at room temperature and at 950 psi with a 10 second dwell to produce a bar of about 0.5 inch thickness. The resulting cherry food bars were dehydrated in a vacuum oven at about 100°–120°F. to a moisture content of about 2.0 percent by weight and having a bulk density of 1.2 gm. per cc.

Several of the above-described cherry food bars were subjected to technological panel testing both dry (i.e. without prior rehydration) and rehydrated by adding to each 30 gm bar 50 ml of water at approximately room temperature and permitting the water to soak into the bar for 10 minutes. Ten trained food technologists were used in each test. Their ratings of the cherry food bars were for color (C), flavor (F), and texture (T) and were averaged for the ten participants, providing hedonic scale values as shown in Table 2. As is well-known, the "hedonic scale" is a nine-point scale by means of which foods are rated, the lowest value in the scale, i.e., 1, representing extreme dislike, and the highest value in the scale, i.e., 9, representing extreme like, and a value of 5 representing neither like, nor dislike, and therefore indicating borderline acceptability.

Table 2

| State of Food Bar | C | F | T |
| --- | --- | --- | --- |
| Dry | 6.8 | 6.7 | 6.2 |
| Rehydrated | 6.1 | 5.3 | 5.3 |

It is apparent that the cherry food bars prepared as described above had good acceptability both in the dry (unrehydrated) state and after rehydration in water at about room temperature for only 10 minutes. Without the potato dice in the food bars, it would have been impossible to have rehydrated bars made in a similar manner (but omitting the potato dice) within any reasonable time period (less than several hours and even then with the rehydrating water at appreciably higher temperatures than room temperature) and it would have been virtually impossible for a person to have bitten through such bars in the dry (unrehydrated) state and to have chewed them without experiencing great discomfort and in some instances breakage of the teeth.

Even after storage of the above-described cherry food bars containing potato dice while hermetically sealed in moisture-proof containers for as long as 1 year at 100°F., the cherry food bars of this example were quite acceptable with respect to color, flavor, and texture both dry (unrehydrated prior to eating) and rehydrated by soaking for 10 minutes in water at about room temperature.

EXAMPLE II

A dehydrated fruit bar was prepared in a similar manner to the cherry food bar of Example I, using the ingredients and percentages (by weight) thereof shown in Table 3 below and employing a pressure of about 1180 psi during compression of the mixture of food bar ingredients into fruit bars. The potato dice were equilibrated to about 10 percent moisture prior to mixing them with the non-potato food bar-forming ingredients and compressing. The dwell time during compression was 10 seconds.

Table 3

| Ingredient | Percentage |
| --- | --- |
| Apple sauce, dehydrated (non-caking) | 38.3 |
| "Durkex 500" oil | 4.1 |
| Potato dice, lemon-flavored, freeze-dried | 19.2 |
| Cherries, Maraschino, dry | 19.2 |
| Raisins, Golden | 9.6 |
| Dates | 9.6 |

The resulting compressed, dehydrated fruit bars had a bulk density of 1.22 gm per cc. They were found to be quite acceptable when consumed without prior rehydration and also when rehydrated by being permitted to soak in about 50 ml of water per 30 gm bar at room temperature for 10 minutes.

EXAMPLE III

A dehydrated pineapple food bar was prepared in a manner similar to the cherry food bar of Example I, using the ingredients and percentages (by weight) thereof shown in Table 4 below and employing a pressure of about 1180 psi during compression of the mixture of food bar-forming ingredients into pineapple food bars. The potato dice were equilibrated to about 14 percent moisture to mixing them with the non-potato food bar-forming ingredients and compressing. The dwell time during compression was 10 seconds.

Table 4

| Ingredient | Percentage |
| --- | --- |
| Apple sauce, dehydrated (non-caking) | 16.1 |
| "Tang", pineapple-flavored | 16.1 |
| Moisture mimetic agent | 11.6 |
| Banana puree, freeze-dried | 8.0 |
| "Texgran" soy protein, orange-pineapple-flavored | 8.0 |
| Pineapple, crushed, freeze-dried | 8.0 |
| Almonds, slivered | 16.1 |
| Potato dice, lemon-flavored, freeze-dried | 16.1 |

The moisture mimetic agent was prepared by adding glycerol to sorbitol at about 180°F. until a shortening-like consistency developed. The mixture of glycerol and sorbitol was then frozen and reduced to a powder in a silent cutter while adding dry ice thereto and maintaining the mixture in a moisture-free atmosphere. The Texgran soy protein, orange-pineapple-flavored was prepared in a manner similar to that used in Example I in preparing the Texgran soy protein, sour cherry-flavored, except that orange-pineapple flavor manufactured by Food Materials Corporation was used instead of Sour Cherry Flavor No. 8139. The pineapple, crushed, freeze-dried was prepared using canned, crushed pineapple which was drained free of juice, then washed and drained, then soaked in a 10 percent solution of glycerol in water for 1 hour, then drained and freeze-dried using platens at about 80°F.

The resulting compressed, dehydrated pineapple food bars were found to be quite acceptable when eaten without prior rehydration and also when rehydrated as in Examples I and II above. They had a bulk density of 1.24 gm per cc.

EXAMPLE IV

A dehydrated lemon food bar was prepared in a manner similar to the dehydrated pineapple food bar of Example III, using the ingredients and percentages (by weight) thereof shown in Table 5 below and employing a pressure of about 1425 psi during compression of the mixture of food bar-forming ingredients into lemon food bars. The potato dice were equilibrated to about 8 percent moisture prior to mixing them with the non-potato food bar-forming ingredients and compressing. The dwell time during compression was 10 seconds.

Table 5

| Ingredient | Percentage |
| --- | --- |
| Apple sauce, dehydrated (non-caking) | 18.1 |
| Lemon powder (Plant Industries Corp.) | 5.2 |
| Moisture mimetic agent | 9.0 |
| Sucrose | 9.0 |
| "Texgran" soy protein, lemon-flavored | 9.0 |
| Banana puree, freeze-dried | 4.5 |
| "Miracle Whip" salad dressing, freeze-dried | 9.0 |
| Almonds, slivered | 18.1 |
| Potato dice, lemon-flavored, freeze-dried | 18.1 |

The Texgran soy protein, lemon-flavored was prepared by blending 8 parts of Texgran with 1 part of lemon-flavored oil mixture prepared by mixing 2 parts of Durkex 500 oil with 1 part of oil lemon, North American Citrus Valley Brand, produced by Dodge & Olcott, Inc., New York, N.Y.

The resulting compressed, dehydrated lemon food bars, having a bulk density of 1.18 gm per cc, were found to be quite acceptable when eaten without prior rehydration and also when rehydrated as in Examples I and II above.

EXAMPLE V

A dehydrated orange food bar was prepared in a manner similar to the dehydrated pineapple food bar of Example III and the dehydrated lemon food bar of Example IV, using the ingredients and percentages (by weight) thereof shown in Table 6 below and employing a pressure of about 1425 psi and a dwell time of 10 seconds. The potato dice were equilibrated to about 6 percent moisture prior to mixing them with the non-potato food bar-forming ingredients and compressing.

Table 6

| Ingredient | Percentage |
| --- | --- |
| Apple sauce, dehydrated (non-caking) | 15.8 |
| Orange powder (Plant Industries Corp.) | 7.8 |
| Moisture mimetic agent | 7.8 |
| Sucrose | 7.8 |
| "Texgran" soy protein, orange-flavored | 7.8 |
| Banana puree, freeze-dried | 4.6 |
| "Miracle Whip" salad dressing, freeze-dried | 7.8 |
| Orange Nuggets (Foamat Foods Corp., Corvallis, Oregon) | 9.0 |
| Almonds, slivered | 15.8 |
| Potato dice, orange-flavored, freeze-dried | 15.8 |

The Texgran soy protein, orange-flavored was prepared by blending 40 parts of Texgran with 7 parts of an orange-flavored oil mixture prepared by mixing 1 part of Durkex 500 oil with 1 part of orange oil.

The resulting compressed, dehydrated orange food bars, having a bulk density of 1.16 gm per cc, were found to be quite acceptable when eaten without prior rehydration and also when rehydrated as in Examples I and II above.

EXAMPLE VI

A dehydrated honey food bar was prepared in a manner similar to the dehydrated pineapple food bar of Example III, the dehydrated lemon food bar of Example IV, and the dehydrated orange food bar of Example V, using the ingredients and percentages (by weight) thereof shown in Table 7 below and employing a pressure of about 1425 psi and a dwell time of 10 seconds. The potato dice were equilibrated to about 5 percent moisture before mixing them with the non-potato food bar-forming ingredients and compressing.

Table 7

| Ingredient | Percentage |
| --- | --- |
| Apple sauce, dehydrated (non-caking) | 13.3 |
| Honey powder (Food Concentrates, Inc., Rahway, N. J.) | 13.3 |
| Moisture mimetic agent | 6.6 |
| Banana puree, freeze-dried | 6.6 |
| "Wesson" vegetable oil | 19.1 |
| Almonds, slivered | 19.1 |
| Silicon dioxide anti-caking agent ("Syloid 244") | 2.9 |
| Potato dice, lemon-flavored, freeze-dried | 19.1 |

The resulting compressed, dehydrated honey food bars, having a bulk density of 1.15 gm per cc, were found to be quite acceptable when eaten without prior rehydration and also when rehydrated as in Examples I and II above.

The essence of the present invention lies in the incorporation throughout the mixture of ingredients in a compressed, dehydrated food bar of discrete particles of potatoes, preferably flavored, in sufficient quantity and size and with a consistency such that a reasonably discontinuous mass of food is obtained in the food bar so that water used in rehydrating the food bar or saliva generated during mastication of the food bar can easily penetrate to all portions of the food bar whether it be broken into small pieces or not. Furthermore, the discrete particles of dehydrated potato swell during rehydration, causing expansion of the bar and opening up of the entire structure of the food bar, thus allowing water of rehydration to penetrate thoroughly and rapidly rehydrate the entire food bar even in relatively cool or cold water. The presence of the potato particles also contributes to making the compressed, dehydrated food bars containing appreciable quantities thereof easily bitable and chewable without prior rehydration but depending only on rehydration by the saliva released in the mouth of the consumer of the food bar.

It is to be understood that other varieties of potatoes than Idaho Russet potatoes may be used to accomplish the objects of the invention. In fact, any of the many varieties of white potatoes may be employed in carrying out the invention. The shape of the subdivided potatoes may vary considerably, as also may the sizes of the potato particles. It is preferred that they be in the form of dice because this form is easily produced and the size and shape are easily controlled. Furthermore, such particles, when compressed, dehydrated, and subsequently rehydrated, expand relatively uniformly, opening up the structure of the food bar and permitting rehydration to take place rapidly and relatively uniformly throughout the food bar. It is preferred that the potato dice in the form of cubes having each side between about 0.25 and about 0.50 inch long be employed. Thus, the preferred volume range for the potato particles is from about 1/64 to about ⅛ cubic inch. It is important that the potato particles not be blanched for so long a time or at so high a temperature that they will tend to become mushy due to overcooking since they must retain their discrete particle state throughout the preparation of the compressed food bars and rehydration thereof in order to accomplish the purpose for which they are used in the food bars.

It is to be understood that other methods of incorporating desirable flavors into the potato particles than the method described above may be employed, the purpose of the flavoring being to mask the natural potato flavor while taking full advantage of the physical characteristics of discrete potato particles distributed throughout the compressed dehydrated food bars which make possible rapid absorption of water accompanied by swelling and breaking up of the natural tendency of the remaining portions of the food bars to adhere tightly one to another.

Since in the freeze-vacuum dehydration of potatoes, as well as most other foods, comparatively little change in volume occurs, the preferred sizes of freeze-dried particles used in making the food bars in accordance with the present invention are from about 1/64 to about ⅛ cubic inch.

After the potato particles have been freeze-vacuum-dehydrated, in order to render them plastic enough to be compressed along with the nonpotato food bar-forming ingredients of the food bars, they must be rehydrated to a reasonable degree. We have found that when used in the food bars in the proportions of from about 10 percent to about 20 percent by weight of all of the ingredients in the food bars, the potato particles should be rehydrated by equilibration with water for from about 3 hours to about 6 hours to attain a relatively uniform moisture content between about 5 percent and about 15 percent prior to mixing thereof with the non-potato food bar-forming ingredients and compression into food bar form. However, it is preferred that the freeze-dried potato particles in cube or dice form be equilibrated to a moisture content between about 10 percent and about 12 percent.

For the purposes of the specification and claims, the non-potato food bar-forming ingredients include all of the ingredients of the food bars except potatoes.

In freeze-vacuum-dehydrating the potato particles the moisture content of the potato particles may be reduced to from about 1 to about 4 percent by weight, but for the potato particles in cube or dice form it is preferred that the moisture content be reduced to from about 1 to about 2 percent.

In the compression of the mixture of freeze-dried potato particles together with the non-potato food bar-forming ingredients of the food bars pressures of from about 800 psi to about 1500 psi may be employed and the compressed food bars will preferably have a thickness of from about 0.25 inch to about 0.75 inch, the thickness of the compressed bar being dependent on the weight of material compressed. If the pressure used is too low, the food bars will crumble too easily in handling, particularly when carried on the person in the field. On the other hand, if the pressure used is too high, the resulting bars would become so dense that they could not be readily bitten and chewed directly without prior rehydration and, furthermore, rehydration would become much too difficult and slow to realize the objective of the military to provide nutritious, compact, dehydrated food bars which will remain stable and safe over long periods of time even at elevated temperatures and which will be capable of being rehydrated throughout the bar material within 10 minutes in water at room temperature or even below room temperature, as frequently becomes necessary during combat or patrol missions. The dwell time in the compression step may be varied from about 5 to about 20 seconds, but is preferably about 10 seconds.

In redrying the compressed food bars of the invention, it is preferred that they be reduced to moisture contents from about 1 percent to about 4 percent by weight.

The final food bar products, after redrying, have densities, for example, generally between about 1.0 and about 1.4 gm. per cc.

The compressed, dehydrated food bars of the invention are very useful for any subsistense purpose or situation where it is important to convert a variety of food products into a very compact form so that a varied diet may be obtained by consumption of one or more food bars or other compact forms of the food and to incorporate long-term stability in the compacted food, yet including in the food the ability to be quickly rehydrated in cold water or to be immediately eaten without prior rehydration if the circumstances require such eating in order to avoid diverting attention away from other important or essential activities or in the event that the consumer would prefer to eat the rations provided for his sustenance in that fashion.

It will be understood that various changes in the details, materials and order in which the steps in the method are carried out which have been described in order to explain the nature of the invention, may be made by those skilled in the art within the principle and scope of the invention.

We claim:

1. A rapidly rehydratable, compacted, dehydrated food bar comprising discrete particles of blanched and freeze-dried potatoes substantially uniformly mixed with non-potato food bar-forming ingredients in the approximate proportion of about 10 to about 20 percent of said particles of potatoes to about 90 to about 80 percent of said non-potato food bar-forming ingredients, said percentages being by weight, said potato particles having volumes of from about 1/64 cubic inch to about ⅛ cubic inch when mixed with said non-potato food bar-forming ingredients, said compacted, dehydrated food bar having a bulk density from about 1.0 to about 1.4 gm per cc and a moisture content of from about 1 percent to about 4 percent by weight.

2. A rapidly rehydratable, compacted, dehydrated food bar according to claim 1, wherein said potato particles are in substantially cube form prior to the mixing and compacting of said mixture of potato particles with said non-potato food bar-forming ingredients.

3. A rapidly rehydratable, compacted, dehydrated food bar according to claim 2, wherein said cubes of potato have volumes of from about 1/64 cubic inch to about ⅛ cubic inch.

4. A method of making a compacted food bar of low moisture content which is rapidly rehydratable in cold water and is directly edible, easily bitable and chewable without prior rehydration which comprises the steps of:

a. spraying freeze-dried potato particles having volumes of from about 1/64 to about ⅛ cubic inch and a moisture content of from about 1.0 percent to about 4.0 percent by weight with sufficient water to increase their moisture content to from about 5 percent to about 15 percent by weight, b. holding said potato particles with said water sprayed thereon in a closed container for a time from about 3 to about 6 hours sufficient to accomplish equilibration of said water in said potato particles, c. adding said equilibrated potato particles to a mixture of non-potato food bar-forming ingredients in the proportion of about 10 percent to about 20 percent by weight of the freeze-vacuum-dehydrated potato particles to about 90 percent to about 80 percent of said non-potato food bar-forming ingredients and blending said equilibrated potato particles with said non-potato food bar-forming ingredients, d. compressing said blended equilibrated potato particle mixture with said non-potato food bar-forming ingredients at a pressure from about 800 psi to about 1500 psi for a dwell time of from about 5 to about 20 seconds to form a compressed food bar of a thickness of about 0.25 to about 0.75 inch, and e. redrying said compressed food bar by vacuum drying to a moisture content of from about 1 percent to about 4 percent by weight.

5. A rapidly rehydratable, compacted, food bar produced by the method of claim 4.

6. A method of making a compacted food bar of low moisture content in accordance with claim 4, wherein said potato particles are in the form of rectangular parallelepipeds.

7. A method of making a compacted food bar of low moisture content in accordance with claim 6, wherein said potato particles are substantially in the form of cubes of potato.

8. A method of making a compacted food bar of low moisture content in accordance with claim 7, wherein said cubes of potato have a moisture content of from about 1 percent to about 2 percent by weight.

9. A rapidly rehydratable, compacted, food bar produced by the method of claim 8.

10. A method of making a compacted food bar of low moisture content in accordance with claim 7, wherein in said steps of spraying said cubes of potato with water and holding said cubes of potato with said water sprayed thereon to accomplish equilibration of said water in said cubes of potato, sufficient water is applied to said cubes of potato to increase their moisture content to from about 10 percent to about 12 percent by weight.

* * * * *